United States Patent Office 3,362,880
Patented Jan. 9, 1968

3,362,880
COMPRESSED DRUG TABLETS OF ETHYL CELLULOSE, GLYCERYL MONOSTEARATE, KARAYA GUM, TRAGACANTH, TALC, AND MAGNESIUM STEARATE
Sampson F. Jeffries, Indianapolis, Ind., assignor to The Dow Chemical Company, Midland, Mich., a corporation of Delaware
No Drawing. Filed Sept. 20, 1963, Ser. No. 310,468
21 Claims. (Cl. 167—82)

This application is a continuation-in-part of the copending application Ser. No. 219,782, filed Aug. 27, 1962 and now abandoned.

This invention relates to an improved pharmaceutical preparation which, in compressed tablet form, breaks down uniformly in an aqueous medium substantially independent of pH and/or the presence of enzymes. The invention also relates to the method of preparing the pharmaceutical preparation and to the improved sustained release tablets made from such preparation.

A medicated tablet conventionally constitutes at least one medically active ingredient and a major proportion of a solid carrier. The solid carrier ordinarily is physiologically inert, and simply serves as a diluent.

In accordance with the present invention, we have found that a highly desirable pharmaceutical preparation of the type containing a large proportion of an active ingredient can be made in the following manner:

(1) dry mix the active ingredient with an ethyl cellulose; wet the dry mixture with alcohol; remove the alcohol from the mixture;
(2) make the foregoing mixture part of an aqueous granulation which may contain one or more additional therapeutic agents in addition to tragacanth, glyceryl monostearate and gum karaya; blend, dry, and sieve the aqueous granulation;
(3) coat the sieved material with an alcoholic solution of an ethyl cellulose; dry the coated material;
(4) blend the coated material with running powders consisting of talc and magnesium stearate and compress the blend into tablets.

The foregoing composition in compressed tablet form provides a long-sustained therapeutic action of three and one-half to eight hours or more. More generally, this compressed tablet serves as a part of a composite tablet, either as a core which is further press-coated or as an initial layer which is compressed together with an additional composition to form a multi-layer tablet in which at least an edge of each layer is exposed.

The invention then consists in the novel compositions of matter, steps, methods, combinations and improvements herein shown and described.

For the purposes of the specification and claims, the active ingredient employed in a large proportion is hereinafter referred to as an active major ingredient.

Suitable active major ingredients include aspirin; p-hydroxyacetanilide; binary mixtures of aspirin and p-hydroxyacetanilide; a mixture of aspirin, acetophenetidin and caffeine; a salicylate; a simple inorganic bromide; ascorbic acid; and physiologically compatible mixtures thereof. The acetylsalicyclic acid and p-hydroxyacetanilide or other active major ingredients used in the present invention are customarily available in commercial quantities in particle sizes in the range passing a No. 20 to a No. 40 sieve, though finer powder grades may be used, if desired.

Suitable salicylates include sodium salicylate, potassium salicylate, calcium salicylate, ammonium salicylate and salicylamide.

The inorganic bromides employed are those which are therapeutically useful, e.g., potassium bromide, sodium bromide, ammonium bromide, calcium bromide or magnesium bromide.

The ethyl cellulose employed is an organo-soluble, ethyl ether of cellulose. Any of the commercially available celluloses can be used which have an ethoxyl content of from 2.2 to 2.6 ethoxyl groups per anhydroglucose unit. This corresponds to an ethoxy range of about 45–49.5 percent weight. While both high and low viscosity types of ethyl cellulose work, the medium viscosity types are to be preferred in making the preparation of the invention.

In addition to the active ingredient employed in major proportions, the present composition may include smaller proportions of therapeutic agents normally employed in lesser amounts. For example, it is often desirable to include decongestants and/or antihistamines with analgesics such as a salicylate, aspirin, or p-hydroxyacetanilide. Examples of suitable decongestants are: phenylpropanolamine hydrochloride, pseudoepinephrine hydrochloride, cyclopentamine hydrochloride, and phenylephrine hydrochloride. Examples of suitable antihistamines include pyrilamine, phenyltoloxamine citrate, prophenpyridamine maleate and chlorpheniramine maleate.

Generally the amount of "smaller proportion" therapeutic agent does not exceed 20 percent by weight of the entire pharmaceutical composition. Most such materials used in smaller proportions, must, when used, be employed in amounts in the range of 1 to 20 percent by weight, and more usually 2 to 10 percent by weight.

"Smaller proportion" materials which may be employed in a composition of the invention having a bromide as the major component include: the belladonna alkaloids, or synthetic anticholinergics.

"Smaller proportion" materials desirably employed with ascorbic acid include appropriate vitamins and growth factors usefully employed in small amounts.

The gums and binding agents employed in preparing the wet granulation, that is, the aqueous mixture, are critically and essentially tragacanth, glyceryl monostearate and karaya gum.

Although it is possible to tablet the dried mixed granulation of the present composition without employing running powders, the use of running powders is so advantageous and highly desirable in facilitating a rapid trouble-free tableting process as to make the powders almost a necessity in commercial operations. The running powders of choice consist of talc and magnesium stearate. If desired, stearic acid or Sterotex, a hydrogenated peanut oil, may be used in place of magnesium stearate.

Each of the necessary and highly desirable components of the composition are employed in a relatively narrow range of proportions in order to meet the principal objectives of the invention, viz., (1) to provide a long-acting, sustained release, pharmaceutical preparation in compressed tablet form, which contains at least one active major ingredient, with or without the inclusion of a smaller proportion therapeutic substance, and (2) to minimize or avoid costly or time-consuming manufacturing operations.

In combining the components of the sustained release composition according to the method of the invention, about 25–47 parts of particulate active major ingredient is dry mixed with about 4 to 6 parts of an ethyl cellulose. The dry mixture is wetted with about 15 to 25 parts of ethyl alcohol and additionally blended. The blended mixture is then dried to remove the alcohol, and sieved, as through a No. 30 sieve.

A water base mixture is then prepared in which about 3 to 8 parts of tragacanth powder, about 16 to 24 parts of glyceryl monostearate and about 16 to 24 parts of karaya gum are wet with water, the above dry granules containing the active major ingredient are incorporated in the wet mass, and the entire mixture is dried and sieved.

If it is desired to include one or more smaller proportion therapeutic substances in the formulation, about 1 to 20 parts by weight of the therapeutic substance or combination thereof is dissolved in about 1 to 5 times as much water by weight and the resulting solution is used to granulate the mixture of gums and glyceryl monostearate.

When a smaller proportion therapeutic substance is used, the amount is selected according to desired drug effect and according to the potency, on a weight basis, of the agent or agents employed. For example, about ten times as much, by weight, of pheniramine maleate is needed to exhibit the same drug effect as a given weight of chlorpheniramine maleate.

The above described wet, i.e., aqueous, granulation is made up in a conventional manner, the granulation being mixed thoroughly after the addition of each of the gums and the glyceryl monostearate. After the addition of the gum karaya, the wet granulation becomes a homogenous dough. At this point, the mixture containing the active major ingredient is added to the wet granulation and thoroughly admixed. This composite mixture is then allowed to dry, preferably at about room temperature. The dried composite mixture is then sieved, for example, through a No. 16 sieve, and further dried, if desired, for about an hour at a warm temperature such as 40° C. before coating the granules with an alcoholic solution of ethyl cellulose. Generally, about 1.3 to 2 parts of an ethyl cellulose dissolved in ethyl alcohol are employed in coating the granules of the dried composite mixture. The coated granules of the composite mixture are readily freed of alcohol with forced air at room temperature, then sieved through, for example, a No. 16 sieve. The sieved material is then intimately admixed with about 1 part of talc and about ¼ part of magnesium stearate. The admixed material is next blended thoroughly and slugged at relatively high compression. The slugged material is further sieved, as through a No. 16 sieve, and admixed with an additional part of talc powder and an additional ¼ part of magnesium stearate, then blended thoroughly. The sieved material is finally blended and compressed into tablets on a standard tableting machine.

The so-prepared pharmaceutical preparation is further characterized as having substantially throughout each tablet the same number of coatings of ethyl cellulose on each particle or granule, of material containing active major ingredient, compressed to form said tablet. The particles or granules are those formed on drying and sieving the granulated material. Such tablets exhibit disintegration times of the order of about 3½ to 8 hours or more, depending on tablet design and the nature of the active major ingredient. Disintegration times for these tablets are increased by making a tablet of more compact design, as well as by compressing the tablets under higher pressures in the conventional tableting machine. Tablets made according to the present invention and containing aspirin, p-hydroxyacetanilide, the aspirin-phenacetin-caffeine mixture or a salicylate salt generally disintegrate in times of 5 to 8 hours or more, while the tablets containing a bromide or ascorbic acid disintegrate in somewhat shorter times such as 3½ to 5 or more hours.

Since it is highly desirable to provide as much of the active major ingredient as possible and still have a sustained release tablet, of moderate size, a preferred composition contains about 45 parts of active major ingredient, about 6.5 parts of an ethyl cellulose, up to 10 parts of a smaller proportion therapeutic substance or mixture of substances, about 5 parts of tragacanth powder, about 20 parts of glyceryl monostearate, about 20 parts of karaya gum, and running powders consisting of about 2 parts of talc and 0.5 part of magnesium stearate.

As indicated hereinabove, the compressed tablet consisting of the sustained release composition is generally press coated or made part of a multi-layer tablet.

The composition of the press coat or additional compressed layer is not ordinarily selected from slowly disintegrable material, but more generally is designed to be readily dispersed or disintegrated so as to provide prompt drug action which is then sustained by the material being steadily freed from the sustained release portion.

Therefore, as a practical matter, the press coat, or the additional compressed layer, is generally made up of one or more physiologically active materials selected from the active major ingredient or smaller proportion therapeutic substance employed in the sustained action part of the tablet, together with a readily-soluble or dispersible physiologically inert carrier such as milk sugar, in addition to starch powder to aid disintegration, and with lubricants such as talc and magnesium stearate.

Press coating of the sustained release tablet portion is carried out in a conventional manner making use of machines adapted for that operation. In these machines, granular press coating material is fed into a die followed by the compressed tablet made of sustained release material. Additional press coating material in granular form is fed into the die on top of the sustained release tablet, and the whole is compressed into one tablet in which the press coating completely envelopes the prior formed tablet.

The multi-layer tablets of the invention are prepared in a conventional manner, as well understood in the art, employing tabletting machines adapted for that purpose. The additional layers in this instance may be formed on one or both faces of the sustained release tablet; however, in this case, the added layer or layers are of substantially the same diameter as the prior formed tablet, and the prior formed tablet is not enveloped by the added layer or layers. At least some surface area, e.g. the edge, of each layer is visible or exposed in the finished multi-layer tablet. The additional layer may also be compressed about the prior formed tablet to form an annular peripheral ring therearound, but leaving two surface areas of the prior formed tablet exposed.

The compressed composite tablet of the invention contains an overall composition, by weight, of 30 to 65 percent, more preferably about 62 percent, of an active major ingredient selected from aspirin, p-hydroxyacetanilide, and mixtures thereof; a mixture of aspirin, acetophenetidin and caffeine; a salicylate; an inorganic bromide; ascorbic acid; and physiologically compatible mixtures thereof; about 3 percent of ethyl cellulose, up to 20 percent but preferably not more than 10 percent, of a small proportion therapeutic substance; 2 to 5 percent, preferably about 3 percent, of tragacanth; 8 to 12 percent, preferably about 10 percent, of glyceryl monostearate; 8 to 12 percent, preferably about 10 percent, of karaya gum; about 4 percent of milk sugar; and about 6 percent of running powders containing starch, talc and magnesium stearate.

In combining the compounds of the sustained release composition according to another embodiment of the method of the invention, about 25 to 47 parts of particulate active major ingredient is dry mixed with about 5.3 to 8 parts of an ethyl cellulose. The dry mixture is wetted with about 20 to 40 parts of ethyl alcohol and additionally blended. The blended mixture is then dried to remove the alcohol, and sieved, as through a No. 30 sieve.

A water base granulation is then prepared in which about 3 to 8 parts of tragacanth powder, about 16 to 24 parts of glyceryl monostearate and about 16 to 24 parts of karaya gum are wet with water and granulated.

If it is desired to include a smaller proportion therapeutic substance in the formulation, about 1 to 20 parts by weight of the therapeutic substance is dissolved in about 1 to 5 times as much water by weight and the resulting solution is used to granulate the mixture of gums and glyceryl monostearate.

The wet granulation is made up in a conventional manner, the granultaion being mixed thoroughly after the addition of each of the gums and the glyceryl monostearate. After the addition of the gum karaya, the wet granulation becomes a homogenous dough. At this point, the mixture containing the active major ingredient is added to the wet granulation and thoroughly admixed. This composite mixture is then allowed to dry, preferably at about room temperature. The desired composite mixture is then sieved, for example, through a No. 16 sieve, and further dried, if desired, for about an hour at a warm temperature such as 40° C. The sieved material is then intimately admixed with about 1 part of talc and about ¼ part of magnesium stearate. The admixed material is then blended thoroughly and slugged at relatively high compression. The slugged material is further sieved, as through a No. 16 sieve, and admixed with an additional part of talc powder and an additional ¼ part of magnesium stearate, then blended thoroughly. The sieved material is finally blended and compressed into tablets on a standard tableting machine. The tablets prepared according to this embodiment of the present method also exhibit disintegration times of the order of about 3½ to 8 hours or more depending on tablet design and the nature of the active major ingredient.

The following examples are illustrative of the present invention but are not to be construed as limiting the scope of the invention.

*Example 1*

As an example of the composition and method of the invention, 18 grams of acetylsalicylic acid in a granular form passing a No. 40 sieve, was dry mixed with an ethyl cellulose of a grade having a viscosity of 23 centipoises. The dry, analgesic mixture was wetted with about 9 milliliters of denatured alcohol and mixed while so wetted. The acetylsalicylic acid-ethyl cellulose mixture was then dried with a stream of forced air at room temperature and sieved. Then 0.8333 gram of phenylephrine hydrochloride, U.S.P., and 0.1333 gram of chlorpheniramine maleate, N.F., were dissolved in about 7 milliliters of water. Two grams of tragacanth powder, U.S.P., were admixed with the so-formed aqueous solution. Then 8 grams of glyceryl monostearate (Aldo 72) were mixed thoroughly into the aqueous mass, followed by 8 grams of karaya gum, N.F. Upon completion of the addition of the karaya gum, the wet mass became a homogenous dough. The dough was added the dried acetylsalicylic acid-ethyl cellulose mixture. The resulting mixture was thoroughly blended and allowed to dry overnight at room temperature. The dried mixture, granular in form, was then forced through a No. 16 sieve (U.S. Sieve Series) and dried for about an hour at 40° C. The dried granules were then coated with an alcoholic solution of ethyl cellulose. The solution consisted of 0.5835 gram of an ethyl cellulose, of a grade having a viscosity of 23 c.p.s., dissolved in about 7 to 10 milliliters of denatured alcohol. The so-coated granules were dried with a stream of forced air at room temperature and then sieved through a No. 16 sieve before being blended with 0.395 gram of talc powder, U.S.P., and 0.1 gram magnesium stearate powder, U.S.P., and slugged at relatively high pressure in a conventional tableting machine. The slugs were broken down by being passed through a No. 16 sieve. The screened material was blended with an additional 0.395 gram of talc powder, U.S.P., and 0.1 gram of magnesium stearate powder, U.S.P., and compressed into tablets on a standard tableting machine to form 100 tablets, each weighing about 405 milligrams.

These tablets were tested according to a modified U.S.P. tablet disintegration test in which the test machine was regulated to oscillate 41 times per minute instead of 30 times per minute. In this test procedure, the tablets exhibited disintegration times of about 6–8 hours in either simulated gastric juice or artificial intestinal fluid. The composition of these sustained release tablets is as follows:

| | Percent |
|---|---|
| Acetylsalicylic acid | 44.4 |
| Ethyl cellulose | 6.38 |
| Phenylephrine HCl, U.S.P. | 2.05 |
| Chlorpheniramine maleate, N.F. | .33 |
| Tragacanth powder, U.S.P. | 4.93 |
| Glyceryl monostearate | 19.73 |
| Karaya gum, N.F. | 19.73 |
| Talc, U.S.P. | 1.95 |
| Magnesium stearate, U.S.P. | 0.5 |

Some of the sustained release tablets described above were press coated in the following manner: 3.4168 grams of milk sugar powder, U.S.P., were granulated with an aqueous solution consisting of 0.4166 gram of phenylephrine hydrochloride, U.S.P., and 0.0666 gram of chlorpheniramine maleate, N.F., dissolved in about 5 milliliters of water. The granulation was dried and sieved through a No. 30 sieve and combined with 32.5 grams of particulate acetylsalicylic acid passing a No. 40 sieve. The mixture was blended before the addition of 1 gram of starch powder, U.S.P., and 0.8 gram of talc, U.S.P., before being further blended. The blended material was slugged in a conventional manner and the slugs broken up by passing through a No. 30 sieve. An additional gram of starch powder, U.S.P., and 0.8 gram of talc powder, U.S.P., were thoroughly blended with the sieved material.

The so-prepared press coating material and the sustained release tablets described above were fed into a press coating machine where 400 milligrams of coating were applied to each of the prior formed tablets.

Disintegration times of the press coated tablets, using the modified U.S.P. test described above, were of the order of 7 hours.

Additional sustained release tablets in the form of multilayer tablets were prepared using the same core composition described above, and for the plural layer, the same material as was employed in press coating. In this case, the tablets somewhat thinner in profile than those employed in press coating operations described above were formed in a tableting machine adapted to make multilayer tablets, and a 400 milligram layer of the described coating material was compressed against one side of each of these initially formed tablets to form a two-layer tablet in which the edge and one side of the initially formed tablet were completely exposed.

In tablet disintegration tests using the modified U.S.P. disintegration test described hereinabove, these plural layer tablets exhibited disintegration times slightly in excess of 5 hours.

In an additional test to demonstrate the sustained release of therapeutic agents from the tablet and composition of the invention, radio-chemical means were used to follow the release of the drug components.

One hundred sustained release tablets having neither a press coating nor a plural layer were prepared in the same manner as described in the foregoing example, except that part of the acetylsalicylic acid employed was prepared using carbon 14 tagged acetic acid so as to serve as a tracer material, while the balance of the acetylsalicylic acid was normal, non-radio active material. The phenylephrine hydrochloride employed was also tagged. The phenylephrine hydrochloride was tagged by converting it into the free base, which was crystallized out, washed and converted back to the hydrochloride by the addition of a small amount of hydrochloric acid labelled with chlorine 36, plus the requisite amount of nonradioactive hydrochloric acid.

The sustained release tablets containing the tagged acetylsalicylic acid and the tagged phenylephrine hydrochloride were subjected to a tablet disintegration test using the rotating bottle method of Souder and Ellenbogen, as described in Drug Standards 26, 77 (1958).

In this test, the samples are placed in closed bottles containing either simulated gastric fluid or artificial intestinal fluid. The closed bottles are attached by one end to a rotating shaft disposed in a water bath maintained at 37° C. On rotating the shaft, the material in the bottles tumbles end over end at a speed of about 44 cycles per minute.

Samples of the disintegrant solution were withdrawn periodically, dried and the radioactivity determined so as to learn the extent of release of the therapeutic materials from the tablet. Using radio-chemical test methods, drug release from the sustained release tablets in each of simulated gastric juice, U.S.P., and artificial intestinal fluid, U.S.P., at various time intervals was found to be as shown in the following table.

DRUG RELEASE FROM SUSTAINED RELEASE TABLETS

| Elapsed Disintegration Time, Hrs. | Simulated Gastric Juice | | In Artificial Intestinal Fluid | |
|---|---|---|---|---|
| | Percent of Total Acetylsalicylic Acid Released | Percent of Total Phenylephrine HCl Released | Percent of Total Acetylsalicylic Acid Released | Percent of Total Phenylephrine HCl Released |
| 0.5 | 4.4 | 37.1 | 10.2 | 33.4 |
| 1 | 8.0 | 53.8 | 20.0 | 52.8 |
| 2 | 25.3 | 70.0 | 28.6 | 67.3 |
| 3.5 | 56.2 | 79.3 | 65.4 | 83.0 |
| 5 | 62.1 | 89.6 | 100.0 | 88.4 |
| 7 | 100.0 | 97.1 | 100.0 | 99.7 |
| 10 | 100.0 | 100.0 | 100.0 | 100.0 |

This data shows the substantially uniform release of the drug components over time periods of at least 5 hours in both fluids.

*Example 2*

As an additional example of the composition and method of the invention, the same composition was made up as described in Example 1, except that p-hydroxyacetanilide was used instead of acetylsalicylic acid. This composition when tabletted in compact, uncoated form, exhibited disintegration times, according to the modified U.S.P. disintegration test described hereinabove, of the order of 7 to 8 hours in either of simulated gastric fluid or artificial intestinal fluid.

*Example 3*

As an example of the composition and method of the invention, 18 grams of aspirin, U.S.P., in a granular form passing a No. 40 sieve was dry mixed with 2.61 grams of an ethyl cellulose of a grade having a viscosity of 23 centipoises. The dry mixture was wetted with about 8.5 milliliters of denatured alcohol and mixed while so wetted. The aspirin-ethyl cellulose mixture was then dried with a stream of forced air at room temperature and sieved. Two grams of tragacanth powder, U.S.P., were admixed with 10 milliliters of distilled water. Then 8 grams of glyceryl monostearate (Aldo 72) were mixed thoroughly into the aqueous tragacanth mass, followed by 8 grams of karaya gum, N.F. Upon completion of the addition of the karaya gum the wet mass became a homogenous dough. To the dough was added the dried aspirin-ethyl cellulose mixture. The resulting mixture was thoroughly blended and allowed to dry overnight at room temperature. The dried mixture, granular in form, was then forced through a No. 16 sieve (U.S. Sieve Series) and dried for about an hour at 40° C. The sieved material was then blended with 0.395 gram of talc powder, U.S.P., and 0.1 gram magnesium stearate powder, U.S.P., and slugged at relatively high pressure in a conventional tableting machine. The slugs were broken down by being passed through a No. 16 sieve. The screened material was blended with an additional 0.395 gram of talc powder, U.S.P., and 0.1 gram of magnesium stearate powder, U.S.P., and compressed into tablets on a standard tableting machine to form about 100 tablets, $11/32$ inch diameter, each weighing about 396 milligrams.

These tablets were tested according to a modified U.S.P. tablet disintegration test in which the test machine was regulated to oscillate 41 times per minute instead of 30 times per minute. In this test procedure, the tablets exhibited disintegration times of about 7–8 hours in artificial intestinal fluid. The percent composition by weight of these sustained release tablets is as follows:

| | Percent |
|---|---|
| Aspirin | 44.6 |
| Ethyl cellulose | 6.52 |
| Tragacanth powder, U.S.P. | 5.0 |
| Glyceryl monostearate | 20.0 |
| Karaya gum, N.F. | 20.0 |
| Talc, U.S.P. | 2.0 |
| Magnesium stearate, U.S.P. | 0.5 |

Some of the sustained release tablets described above were press coated in the following manner: 3.9 grams of milk sugar powder, U.S.P., and 32.5 grams of aspirin, 40 mesh U.S.P., were dry blended and then mixed with one gram of starch powder, U.S.P., and 0.8 gram of talc, U.S.P. This dry mixture was slugged on a conventional tableting machine. The slugged material was forced through a No. 30 sieve, then blended with one gram of starch powder, U.S.P., and 0.8 gram of talc, U.S.P. The final blended mixture was applied to the sustained release tablets in a press coating machine, 400 milligrams of press coating material being applied to each tablet.

*Example 4*

As an example of the composition and method of the invention, 18 grams of aspirin, U.S.P., in a granular form passing a No. 40 sieve was dry mixed with 2 grams of an ethyl cellulose of a grade having a viscosity of 23 centipoises. The dry mixture was wetted with about 8 milliliters of denatured alcohol and mixed while so wetted. The aspirin-ethyl cellulose mixture was then dried with a stream of forced air at room temperature and sieved. Phenylephrine hydrochloride, U.S.P. (0.8333 gram) and chlorpheniramine maleate N.F. (0.1333 gram) were dissolved in 7 milliliters of distilled water. Two grams of tragacanth powder, U.S.P., were admixed with the so-prepared solution. Then 8 grams of glyceryl monostearate (Aldo 72) were mixed thoroughly into the aqueous tragacanth mass, followed by 8 grams of karaya gum, N.F. Upon completion of the addition of the karaya gum, the wet mass became a homogenous dough. To the dough was added the dried aspirin-ethyl cellulose mixture. The resulting mixture was thoroughly blended and allowed to dry overnight at room temperature. The dried mixture, granular in form, was then forced through a No. 16 sieve (U.S. Sieve Series) and dried for about an hour at 40° C. The dried granules were then coated with an alcoholic solution of ethyl cellulose. The solution consisted of 0.5835 gram of an ethyl cellulose of a grade having a viscosity of 23 centipoises, dissolved in about 12 milliliters of denatured alcohol. The so-called granules were dried with a stream of forced air at room temperature and then sieved through a No. 16 sieve before being blended with 0.395 gram of talc powder, U.S.P., and 0.1 gram magnesium stearate powder, U.S.P., and slugged at relatively high pressure in a conventional tableting machine. The slugs were broken down by being passed through a No. 16 sieve. The screened material was blended with an additional 0.395 gram of talc powder, U.S.P., and 0.1 gram of magnesium stearate powder, U.S.P., and compressed into tablets on a standard tableting machine to form 100 tablets, each weighing about 405 milligrams.

These tablets were tested according to a modified U.S.P. tablet disintegration test in which the test machine was regulated to oscillate 41 times per minute instead of 30 times per minute. In the test employed, the tablets were oscillated in artificial gastric juice for 30 minutes before continuing the test with artificial intestinal fluid. Under these conditions, the tablets exhibited disintegration times of from 7 to 7.5 hours.

The composition of these sustained release tablets is as follows:

| | Percent |
|---|---|
| Aspirin | 44.5 |
| Ethyl cellulose | 6.4 |
| Phenylephrine HCl, U.S.P. | 2.06 |
| Chlorpheniramine maleate, N.F. | 0.33 |
| Tragacanth powder, U.S.P. | 5.0 |
| Glyceryl monostearate | 19.8 |
| Karaya gum, N.F. | 19.8 |
| Talc, U.S.P. | 2.0 |
| Magnesium stearate, U.S.P. | 0.5 |

*Example 5*

As an example of the composition and method of the invention, 18 grams of aspirin, U.S.P., in a granular form passing a No. 40 sieve were dry mixed with 2 grams of an ethyl cellulose of a grade having a viscosity of 23 centipoises. The dry mixture was wetted with about 8 milliliters of denatured alcohol and mixed while so wetted. The aspirin-ethyl cellulose mixture was then dried with a stream of forced air at room temperature and sieved. Two grams of tragacanth powder, U.S.P., were admixed with 7 milliliters of distilled water. Then 8 grams of glyceryl monostearate (Aldo 72) were mixed thoroughly into the aqueous tragacanth mass, followed by 8 grams of karaya gum, N.F. Upon completion of the addition of the karaya gum, the wet mass became a homogenous dough. To the dough was added the dried aspirin-ethyl cellulose mixture. The resulting mixture was thoroughly blended and allowed to dry overnight at room temperature. The dried mixture, granular in form, was then forced through a No. 16 sieve (U.S. Sieve Series) and dried for about an hour at 40° C. The dried granules were then coated with an alcoholic solution of ethyl cellulose. The solution consisted of 0.5835 gram of an ethyl cellulose of a grade having a viscosity of 23 centipoises, dissolved in about 12 milliliters of denatured alcohol. The so-coated granules were dried with a stream of forced air at room temperature and then sieved through a No. 16 sieve before being blended with 0.395 gram of talc powder, U.S.P., and 0.1 gram magnesium stearate powder, U.S.P., and slugged at relatively high pressure in a conventional tableting machine. The slugs were broken down by being passed through a No. 16 sieve. The screened material was blended with an additional 0.395 gram of talc powder, U.S.P., and 0.1 gram of magnesium stearate powder, U.S.P. and compressed into tablets on a standard tableting machine to form 100 tablets, each weighing about 400 milligrams.

These tablets were tested according to a modified U.S.P. tablet disintegration test in which the test machine was regulated to oscillate 41 times per minute instead of 30 times per minute. In the test employed, the tablets were oscillated in artificial gastric juice for 30 minutes before continuing the test with artificial intestinal fluid. Under these conditions, the tablets exhibited disintegration times of from 5 hours and 58 minutes to 6 hours and 12 minutes.

The composition of these sustained release tablets is as follows:

| | Percent |
|---|---|
| Aspirin | 45.5 |
| Ethyl cellulose | 6.55 |
| Tragacanth, U.S.P. | 5.0 |
| Glyceryl monostearate | 20.6 |
| Karaya gum, N.F. | 20.6 |
| Talc, U.S.P. | 2.0 |
| Magnesium stearate, U.S.P. | 0.5 |

*Example 6*

As an example of the composition and method of the invention in which there is employed as the active major ingredient a mixture of active materials, 10.05 grams of aspirin, U.S.P., 7.23 grams of acetophenetidin, U.S.P., and 0.72 gram of caffeine, anhydrous U.S.P., were dry mixed with two grams of an ethyl cellulose of a grade having a viscosity of 23 centipoises. The dry mixture was wetted with about 8 milliliters of denatured alcohol and mixed while so wetted. The active major ingredient-ethyl cellulose mixture was then dried with a stream of forced air at room temperature and sieved. Two grams of tragacanth powder, U.S.P., were admixed with 7 milliliters of distilled water. Then 8 grams of glyceryl monostearate (Aldo 72) were mixed thoroughly into the aqueous tragacanth mass, followed by 8 grams of karaya gum, N.F. Upon completion of the addition of the karaya gum, the wet mass became a homogenous dough. To the dough was added the dried active major ingredient-ethyl cellulose mixture. The resulting mixture was thoroughly blended and allowed to dry overnight at room temperature. The dried mixture, granular in form, was then forced through a No. 16 sieve (U.S. Sieve Series) and dried for about an hour at 40° C. The dried granules were then coated with an alcoholic solution of ethyl cellulose of a grade having a viscosity of 23 centipoises, dissolved in about 12 milliliters of denatured alcohol. The so-coated granules were dried with a stream of forced air at room temperature and then sieved through a No. 16 before being blended with 0.395 gram of talc powder, U.S.P., and 0.1 gram magnesium stearate powder, U.S.P., and slugged at relatively high pressure in a conventional tableting machine. The slugs were broken down by being passed through a No. 16 sieve. The screened material was blended with an additional 0.395 gram of talc powder, U.S.P., and 0.1 gram of magnesium stearate powder, U.S.P., and compressed into tablets on a standard tableting machine to form 100 tablets, each weighing about 400 milligrams.

These tablets were tested according to a modified U.S.P. tablet disintegration test in which the test machine was regulated to oscillate 41 times per minute instead of 30 times per minute. In the test employed, the tablets were oscillated in artificial gastric juice for 30 minutes before continuing the test with artificial intestinal fluid. Under these conditions, the tablets exhibited disintegration times of from 5.5 hours to 5.75 hours.

The composition of these sustained release tablets is as follows:

| | Percent |
|---|---|
| Aspirin, U.S.P. | 25.4 |
| Acetophenetidin, U.S.P. | 18.3 |
| Caffeine, anhydrous U.S.P. | 1.8 |
| | 45.5 |
| Ethyl cellulose | 6.0 |
| Tragacanth powder, U.S.P. | 5.0 |
| Glyceryl monostearate | 20.5 |
| Karaya gum, N.F. | 20.5 |
| Talc, U.S.P. | 2.0 |
| Magnesium stearate, U.S.P. | 0.5 |

*Example 7*

As an example of the composition and method of the invention, 18 grams of sodium bromide, U.S.P., were dry mixed with 2 grams of an ethyl cellulose of a grade having a viscosity of 23 centipoises. The dry mixture was granulated with about 3 milliliters of denatured alcohol. The sodium bromide-ethyl cellulose granulation was dried with a stream of forced air at room temperature and sieved through a No. 20 sieve. Two grams of tragacanth powder, U.S.P., were admixed with 9 milliliters of distilled water. Then 8 grams of glyceryl monostearate (Aldo 72) were mixed thoroughly into the aqueous tragacanth mass, followed by 8 grams of karaya gum, N.F. Upon completion of the addition of the karaya gum, the wet mass becomes a homogenous dough. To the dough was added the dried sodium bromide-ethyl cellulose mixture. The resulting mixture was thoroughly blended and allowed to dry overnight at room temperature. The dried mixture, granular in form, was then forced through a No. 16 sieve and dried for about an hour at 40° C. The dried granules were then coated with an alcoholic solution of ethyl cellulose. The solution consisted of 0.5835 gram of an ethyl cellulose, of a grade having a viscosity of 23 centipoises, dissolved in about 12 milliliters of denatured alcohol. The so-coated granules were dried with a stream of forced air at room temperature and then sieved through a No. 16 sieve before being blended with 0.395 gram of talc powder, U.S.P., and 0.1 gram magnesium stearate powder, U.S.P., and slugged at relatively high pressure in a conventional tableting machine. The slugs were broken down by being passed through a No. 16 sieve. The screened material was blended with an additional 0.395 gram of talc powder, U.S.P., and 0.1 gram of magnesium stearate powder, U.S.P., and compressed into tablets on a standard tableting machine to form 100 tablets, each weighing about 400 milligrams.

These tablets were tested according to a modified U.S.P. tablet disintegration test in which the test machine was regulated to oscillate 41 times per minute instead of 30 times per minute. In the test employed, the tablets were oscillated in artificial gastric juice for 30 minutes before continuing the test with artificial intestinal fluid. Under these conditions, the tablets exhibited disintegration times of from 5 hours and 43 minutes to 6 hours and 10 minutes.

The composition of these sustained release tablets is as follows:

|  | Percent |
| --- | --- |
| Sodium bromide, U.S.P. | 45.5 |
| Ethyl cellulose | 6.55 |
| Tragacanth, U.S.P. | 5.0 |
| Glyceryl monostearate | 20.6 |
| Karaya gum, N.F. | 20.6 |
| Talc, U.S.P. | 2.0 |
| Magnesium stearate, U.S.P. | 0.5 |

*Example 8*

As an example of the composition and method of the invention, a formulation was prepared which is identical to the formulation shown in Example 7 except that 18 grams of sodium salicylate U.S.P., was used in place of 18 grams of sodium bromide. The tablets prepared from this composition were tested in the same manner as the tablets containing sodium bromide and were found to exhibit disintegration times of from 3 hours and 30 minutes to 3 hours and 50 minutes.

As used in the specification and the appended claims, the phrase "composite compressed tablet" is meant to refer to a tablet produced by a small plural number of successive compressions in a process in which a core or initial layer is formed in the first compression, and additional material is compressed around or against the first tablet in each successive compression step.

I claim:

1. The method of preparing a pharmaceutical preparation in the form of a slowly disintegrable tablet which comprises: intimately admixing about 25 to 47 parts of an active major ingredient with 4 to 6 parts of an ethyl cellulose, wetting the active major ingredient admixture with alcohol; drying the active major ingredient admixture thereby removing alcohol therefrom; intimately admixing the so-dried active major ingredient admixture with a wet granulation consisting of about 3 to 8 parts tragacanth, about 16 to 24 parts of glyceryl monostearate, about 16 to 24 parts karaya gum, and water; drying the so-obtained wet granulation mixture; sieving the dried granulation mixture; coating the sieved granulation mixture with an alcoholic solution of an ethyl cellulose containing about 1.3 to 2 parts of an ethyl cellulose; drying the coated granulation mixture thereby removing alcohol therefrom; sieving the dried coated granulation mixture; blending the coated and sieved granulation mixture with running powders consisting of talc and magnesium stearate; and compressing the blended material into tablet form.

2. The method of preparing a pharmaceutical preparation in the form of a slowly disintegrable tablet which comprises: intimately admixing about 25 to 47 parts of an active major ingredient with 4 to 6 parts of an ethyl cellulose, wetting the active major ingredient admixture with alcohol; drying the active major ingredient admixture thereby removing alcohol therefrom; intimately admixing the so-dried active major ingredient admixture with a wet granulation consisting of up to 20 parts of a smaller proportion therapeutic substance selected from the group consisting of a selected therapeutic agent and a combination of selected therapeutic agents, about 3 to 8 parts tragacanth, about 16 to 24 parts of glyceryl monostearate, about 16 to 24 parts karaya gum, and water; drying the so-obtained wet granulation mixture; sieving the dried granulation mixture; coating the sieved granulation mixture with an alcoholic solution of an ethyl cellulose containing about 1.3 to 2 parts of an ethyl cellulose; drying the coated granulation mixture thereby removing alcohol therefrom; sieving the dried coated granulation mixture; blending the coated and sieved granulation mixture with running powders consisting of talc and magnesium stearate; and compressing the blended material into tablet form.

3. The method as in claim 2 in which the tablet is additionally press coated with a composition comprising milk sugar, running powders, and at least one physiologically active substance selected from the group consisting of an active major ingredient and a smaller proportion therapeutic substance.

4. The method as in claim 2 plus the additional steps comprising compressing against at least one surface of said slowly disintegrable tablet a composition comprising milk sugar, running powders, and at least one physiologically active substance selected from the group consisting of an active major ingredient and a smaller proportion therapeutic substance, thereby to form a multi-layered tablet having at least the edge of each layer exposed.

5. The method of preparing a pharmaceutical preparation in the form of a slowly disintegrable tablet which comprises: intimately admixing about 25 to 47 parts of an active major ingredient with 5.3 to 8 parts of an ethyl cellulose, wetting the active major ingredient admixture with alcohol; drying the active major ingredient admixture thereby removing alcohol therefrom; intimately admixing the so-dried active major ingredient admixture with a wet granulation consisting of about 3 to 8 parts tragacanth, about 16 to 24 parts glyceryl monostearate, about 16 to 24 parts karaya gum, and water; drying the so-obtained wet granulation mixture; sieving the dried granulation mixture; coating the sieved granulation mixture with an alcoholic solution of an ethyl cellulose containing about 1.3 to 2 parts of an ethyl cellulose; drying the coated granulation mixture thereby removing alcohol therefrom; sieving the dried coated granulation mixture blending the coated and sieved granulation mixture with running powders consisting of talc and magnesium stearate; and compressing the blended material into tablet form.

6. The method of preparing a pharmaceutical preparation in the form of a slowly disintegrable tablet which comprises: intimately admixing about 25 to 47 parts of an active major ingredient with 5.3 to 8 parts of an ethyl cellulose, wetting the active major ingredient admixture with alcohol; drying the active major ingredient admixture thereby removing alcohol therefrom; intimately admixing the so-dried active major ingredient admixture with a wet granulation consisting of up to 20 parts of a small proportion therapeutic substance selected from the group consisting of a selected therapeutic agent and a combination of selected therapeutic agents, about 3 to 8 parts tragacanth, about 16 to 24 parts glyceryl monostearate, about 16 ot 24 parts karaya gum, and water; drying the so-obtained wet granulation mixture; sieving the dried granulation mixture; coating the sieved granulation mixture with an alcoholic solution of an ethyl cellulose containing about 1.3 to 2 parts of an ethyl cellulose; drying the coated granulation mixture thereby removing alcohol therefrom; sieving the dried coated granulation mixture blending the coated and sieved granulation mixture with running powders consisting of talc and magnesium stearate; and compressing the blended material into tablet form.

7. The method as in claim 2 in which the tablet is additionally press coated with a composition comprising milk sugar, running powders, and at least one physiologically active substance selected from the group consisting of an active major ingredient and a smaller proportion therapeutic substance.

8. The method as claim 2 plus the additional steps comprising compressing against at least one surface of said slowly disintegrable tablet a composition comprising milk sugar, running powders, and at least one physiologically active substance selected from the group consisting of an active major ingredient and a smaller proportion therapeutic substance, thereby to form a multilayered tablet having at least the edge of each layer exposed.

9. A pharmaceutical preparation in compressed tablet form consisting essentially of, by weight, about 25 to 47 parts of an active major ingredient, about 5.3 to 8 parts of ethyl cellulose, about 3 to 8 parts of tragacanth, about 16 to 24 parts of glyceryl monostearate, about 16 to 24 parts of karaya gum, and running powders consisting of talc and magnesium stearate, said compressed tablet being slowly disintegrable at a substantially uniform rate in an aqueous medium substantially independent of the pH of said medium, and the pharmaceutical preparation being further characterized as having substantially throughout each tablet the same number of coatings of ethyl cellulose on each particle, of material containing active major ingredient, compressed to form said tablet, prepared in accordance with the method of claim 1.

10. A pharmaceutical preparation in compressed tablet form consisting essentially of, by weight, about 25 to 47 parts of an active major ingredient, selected from the group consisting of aspirin; p-hydroxyacetanilide; binary mixtures of aspirin and p-hydroxyacetanilide; a mixture consisting of acetophenetidin and caffeine; a salicylate; an inorganic bromide; ascorbic acid; and physiologically acceptable mixtures thereof; about 5.3 to 8 parts of ethyl cellulose, about 3 to 8 parts of tragacanth, about 16 to 25 parts of glyceryl monostearate, about 16 to 24 parts of karaya gum, and running powders consisting of talc and magnesium stearate, said compressed tablet being slowly disintegrable at a substantially uniform rate in an aqueous medium substantially independent of the pH of said medium, and the pharmaceutical preparation being further characterized as having substantially throughout each tablet the same number of coatings of ethyl cellulose on each particle, of material containing active major ingredient, compressed to form said tablet, prepared in accordance with the method of claim 1.

11. A pharmaceutical preparation in compressed tablet form consisting essentially of, by weight, about 25 to 47 parts of aspirin, about 5.3 to 8 parts of ethyl cellulose, about 3 to 8 parts of tragacanth, about 16 to 24 parts of glyceryl monostearate, about 16 to 24 parts of karaya gum, and running powders consisting of talc and magnesium stearate, said compressed tablet being slowly disintegrable at a substantially uniform rate in an aqueous medium substantially independent of the pH of said medium, and the pharmaceutical preparation being further characterized as having substantially throughout each tablet the same number of coatings of ethyl cellulose on each particle, of material containing aspirin, compressed to form said tablet, prepared in accordance with the method of claim 1.

12. A pharmaceutical preparation in compressed tablet form consisting essentially of, by weight, about 25 to 47 parts of an active major ingredient, about 5.3 to 8 parts of ethyl cellulose, about 3 to 8 parts of tragacanth, about 16 to 24 parts of glyceryl monostearate, about 16 to 24 parts of karaya gum, and running powders consisting of talc and magnesium stearate, the active major ingredient being present in the tablet as compressed particulate material coated with at least a part of the said ethyl cellulose and said coated particulate material being embedded in a mixture of a compressed granulation and the running powders, the compressed granulation consisting of the coated particulate, the tragacanth, the glyceryl monostearate and the karaya gum, and the granules of the compressed granulation being coated with the balance of the ethyl cellulose, prepared in accordance with the method of claim 1.

13. A pharmaceutical preparation in compressed tablet form consisting essentially of, by weight, about 25 to 47 parts of an active major ingredient, about 5.3 to 8 parts of ethyl cellulose, up to about 20 parts of a smaller proportion therapeutic substance selected from the group consisting of a selected therapeutic agent and combinations of selected therapeutic agents, about 3 to 8 parts of tragacanth, about 16 to 24 parts of glyceryl monostearate, about 16 to 24 parts of karaya gum, and running powders consisting of talc and magnesium stearate, said compressed tablet being slowly disintegrable at a substantially uniform rate in an aqueous medium substantially independent of the pH of said medium, and the pharmaceutical preparation being further characterized as having substantially throughout each tablet the same number of coatings of ethyl cellulose on each particle, of material containing active major ingredient, compressed to form said tablet, prepared in accordance with the method of claim 2.

14. A pharmaceutical preparation in compressed tablet form consisting essentially of, by weight, about 45 parts of an active major ingredient selected from the group consisting of aspirin; p-hydroxyacetanilide; a binary mixture of aspirin and p-hydroxyacetanilide; a mixture of aspirin, acetophenetidin and caffeine; a salicylate; an inorganic bromide; ascorbic acid; and physiologically acceptable mixtures thereof; about 6.5 parts of an ethyl cellulose, about 2 to 10 parts of a smaller proportion therapeutic substance selected from the group consisting of a selected therapeutic agent and combinations of selected therapeutic agents, about 5 parts of tragacanth, about 20 parts of glyceryl monostearate, about 20 parts of karaya gum, and running powders consisting of talc and magnesium stearate, said compressed tablet being slowly disintegrable at a substantially uniform rate in an aqueous medium substantially independent of the pH of said medium, and the pharmaceutical preparation being further characterized as having substantially throughout each tablet the same number of coatings of ethyl cellulose on each particle, of material containing active major ingredient, compressed to form said tablet, prepared in accordance with the method of claim 2.

15. A pharmaceutical preparation in compressed tablet form consisting essentially of, by weight, about 45 parts of aspirin, about 6 parts of ethyl cellulose, about 2 parts of phenylephrine hydrochloride, about 0.3 part of chloropheniramine maleate, about 5 parts of tragacanth, about 20 parts of glyceryl monostearate, about 20 parts of karaya gum, and running powders consisting of talc and magnesium stearate, said compressed tablet being slowly disintegrable at a substantially uniform rate in an aqueous medium substantially independent of the pH of said medium, and the pharmaceutical preparation being further characterized as having substantially throughout each tablet the same number of coatings of ethyl cellulose on each particle, of material containing aspirin, compressed to form said tablet, prepared in accordance with the method of claim 2.

16. A pharmaceutical preparation in the form of a composite compressed tablet having a sustained release portion, said composite tablet consisting essentially of, by weight, about 62 percent of an active major ingredient, about 3 percent of ethyl cellulose, about 2 to 5 percent of tragacanth, about 8 to 12 percent of glyceryl monostearate, about 8 to 12 percent of karaya gum, about 4 percent of milk sugar, and about 6 percent of running powders containing starch, talc and magnesium stearate, and the pharmaceutical preparation being further characterized as having substantially throughout each tablet the same number of coatings of ethyl cellulose on each particle, of material containing active major ingredient, compressed to form said tablet, prepared in accordance with the method of claim 3.

17. A pharmaceutical preparation in the form of a composite compressed tablet having a sustained release portion, said composite tablet consisting essentially of, by weight, about 62 percent of an active major ingredient, selected from the group consisting of aspirin; p-hydroxyacetanilide; a binary mixture of aspirin and p-hydroxyacetanilide; a mixture of aspirin, acetophenetidin and caffeine; a salicylate; an inorganic bromide; ascorbic acid; and physiologically acceptable mixtures thereof; about 3 percent of ethyl cellulose, up to 20 percent of a smaller proportion therapeutic substance selected from the group consisting of a selected therapeutic agent and combinations of selected therapeutic agents, about 2 to 5 percent of tragacanth, about 8 to 12 percent of glyceryl monostearate, about 8 to 12 percent of karaya gum, about 4 percent of milk sugar, about 2.5 percent of starch, about 3 percent of talc, and about 0.25 percent of magnesium stearate, and the pharmaceutical preparation being further characterized as having substantially throughout each tablet the same number of coatings of ethyl cellulose on each particle, of material containing active major ingredient, compressed to form said tablet, prepared in accordance with the method of claim 4.

18. A pharmaceutical preparation in composite compressed tablet form having a core and a press coat, said core being a compressed tablet consisting essentially of, by weight, about 25 to 47 parts of an active major ingredient, about 5.3 to 8 parts of ethyl cellulose, up to 20 parts of a smaller proportion therapeutic substance selected from the group consisting of a selected therapeutic agent and combinations of selected therapeutic agents, about 3 to 8 parts of tragacanth, about 16 to 24 parts of glyceryl monostearate, about 16 to 24 parts of karaya gum, said compressed tablet being slowly disintegrable at a substantially uniform rate in an aqueous medium substantially independent of the pH of said medium, said press coat comprising milk sugar, running powders, and at least one physiologically active material selected from the group consisting of an active major ingredient, a smaller proportion therapeutic substance and physiologically acceptable mixtures thereof, and the pharmaceutical preparation being further characterized as having substantially throughout each tablet the same number of coatings of ethyl cellulose on each particle, of material containing active major ingredient, compressed to form said tablet, prepared in accordance with the method of claim 3.

19. A pharmaceutical preparation in composite compressed tablet form having a core and a press coat, said core being a compressed tablet consisting essentially of, by weight, about 25 to 47 parts of an active major ingredient, selected from the group consisting of aspirin; p-hydroxyacetanilide; a binary mixture of aspirin and p-hydroxyacetanilide; a mixture of aspirin, phenacetin and caffeine; a salicylate; an inorganic bromide; ascorbic acid; and physiologically acceptable mixtures thereof; about 5.3 to 8 parts of ethyl cellulose, about 3 to 8 parts of tragacanth, about 16 to 24 parts of glyceryl monostearate, about 16 to 24 parts of karaya gum, and running powders consisting of talc and magnesium stearate, said compressed tablet being slowly disintegrable at a substantially uniform rate in an aqueous medium substantially independent of the pH of said medium, said press coat being compressed about said core, and said press coat comprising milk sugar, running powders and the said active major ingredient, and the pharmaceutical preparation being further characterized as having substantially throughout each tablet the same number of coatings of ethyl cellulose on each particle, of material containing active major ingredient, compressed to form said tablet, prepared in accordance with the method of claim 3.

20. A pharmaceutical preparation in the form of a composite compressed tablet having a sustained release portion consisting of a first compressed tablet layer and at least one additional tablet layer compressed against a surface thereof, said first compressed tablet layer consisting essentially of, by weight, about 25 to 47 parts of an active major ingredient, selected from the group consisting of aspirin; p- hydroxyacetanilide; a binary mixture of aspirin and p-hydroxyacetanilide; a mixture of aspirin, acetophenetidin and caffeine; a salicylate; an inorganic bromide; ascorbic acid; and physiologically acceptable mixtures thereof; about 5.3 to 8 parts of an ethyl cellulose, up to 20 parts of a smaller proportion therapeutic substance selected from the group consisting of a selected therapeutic agent and combinations of selected therapeutic agents, about 3 to 8 parts of tragacanth, about 16 to 24 parts of glyceryl monostearate, about 16 to 24 parts of karaya gum, and running powders consisting of talc and magnesium stearate, said first compressed tablet being slowly disintegrabable at a substantially uniform rate in an aqueous medium substantially independent of the pH of said medium, at least the edge of said first compressed tablet being exposed, said additional tablet layer comprising milk sugar, running powders and at least one physiologically active material selected from the group consisting of an active major ingredient, a smaller proportion therapeutic substance and mixtures thereof, and the pharmaceutical preparation being further characterized as having substantially throughout each tablet the same number of coatings of ethyl cellulose on each particle, of material containing active major ingredient, compressed to form said tablet, prepared in accordance with the method of claim 4.

21. A pharmaceutical preparation in the form of a composite compressed tablet consisting of a core and a press coat, said core being a compressed tablet consisting essentially of, by weight, about 45 percent of aspirin, about 6 percent of ethyl cellulose, about 2 percent of phenylephrine hydrochloride, about 0.3 percent of chlorpheniramine maleate, about 5 percent of tragacanth, about 20 percent of glyceryl monostearate, about 20 percent of karaya gum, and running powders consisting of talc and magnesium stearate, said compressed tablet being slowly disintegrable at a substantially uniform rate in an aqueous medium substantially independent of the pH of said medium, said press coat being compressed about said core, said press coat comprising milk sugar, running powders and at least one physiologically active material selected from the group consisting of aspirin, phenylephrine hydrochloride and chlorpheniramine maleate, and the pharmaceutical preparation being further characterized as having substantially throughout each tablet the same number of coatings of ethyl cellulose on each particle, of material containing aspirin, compressed to form said tablet, prepared in accordance with the method of claim 3.

References Cited

UNITED STATES PATENTS

| | | | |
|---|---|---|---|
| 2,798,838 | 7/1957 | Robinson et al. | 167—82 |
| 2,980,589 | 4/1961 | De Grunigen | 167—82 |
| 2,993,836 | 7/1961 | Nash et al. | 167—82 |
| 3,115,441 | 12/1963 | Hermelin | 167—82 |
| 3,133,863 | 5/1964 | Tansey | 167—82 |
| 2,793,979 | 5/1957 | Svedres | 167—82 |
| 2,853,420 | 9/1958 | Lowey | 167—82 |
| 3,019,169 | 1/1962 | Klumpp et al. | 167—82 |

LEWIS GOTTS, *Primary Examiner.*

G. A. MENTIS, S. K. ROSE, *Assistant Examiners.*